UNITED STATES PATENT OFFICE.

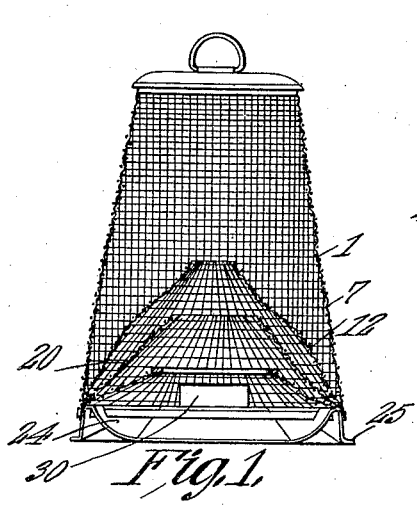
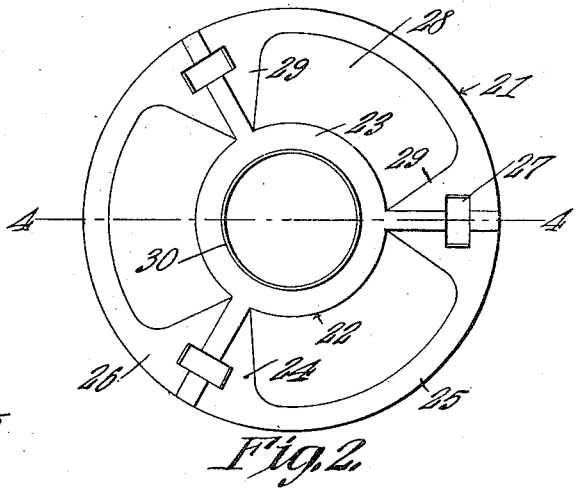
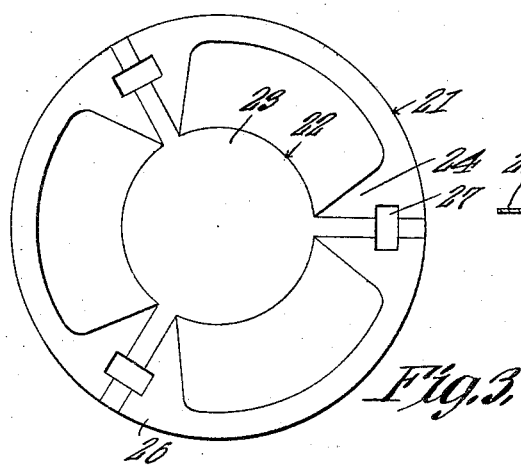
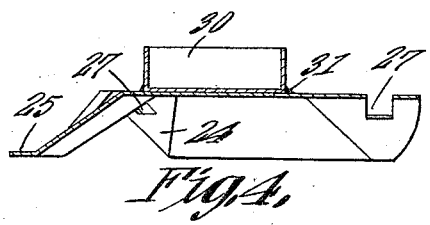
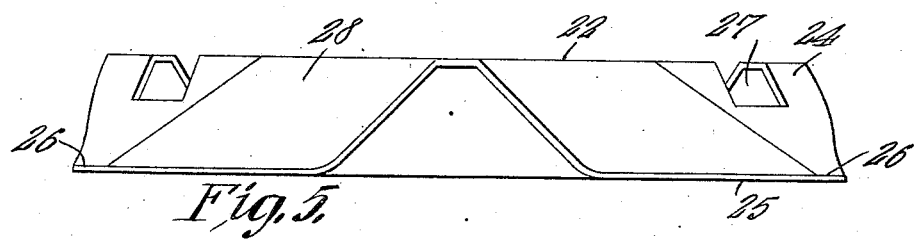

JAMES GUY, OF KANSAS CITY, MISSOURI.

BOTTOM FOR FLY-TRAPS.

1,182,475. Specification of Letters Patent. Patented May 9, 1916.

Application filed July 26, 1915. Serial No. 41,976.

*To all whom it may concern:*

Be it known that I, JAMES GUY, a citizen of the United States, residing at Kansas City, in the county of Jackson and State of Missouri, have invented a new and useful Bottom for Fly-Traps, of which the following is a specification.

The device forming the subject matter of this application is a bottom for an insect trap, and the invention aims to provide an element of the sort above mentioned which may be fashioned at trifling expense and may be kept clean.

Another object of the invention is to provide a one-piece metal bottom for a fly trap so constructed that it will at once support the receptacle portion of the trap and prevent the receptacle portion of the trap from moving laterally, adequate means being provided whereby insects may enter the trap.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, a trap wherewith the base forming the subject matter of this application has been assembled, parts being broken away; Fig. 2 shows the base in top plan; Fig. 3 is a bottom plan of the base; Fig. 4 is a cross section of the base on the line 4—4 of Fig. 2; Fig. 5 is an elevation of the base.

In the accompanying drawings, the numeral 1 indicates a receptacle within which is located an outer leader 7 bridging an intermediate leader 12 which in its turn overhangs an inner leader 20. These elements are shown in my prior Patent No. 1,065,241, and need not be described in detail. When the specific construction of the base forming the subject matter of this application is understood, it will be obvious that the leader and receptacle portions of the device may be altered without entirely nullifying the novel and useful features of the base.

The base above alluded to is fashioned from a single sheet of metal struck upwardly to form a frusto-conical boss 22 having a flat top 23, and to form inverted, trough-shaped ribs 24 radiating from the boss, the base embodying a marginal supporting rim 25 merging as shown at 26 into the ribs 24. In the upper edges of the ribs 24, notches 27 are formed and into the notches 27, the lower edges of the receptacle 1, and the leaders 7, 12 and 20 may be inserted, the receptacle and the leaders thus being supported on the ribs 24 and being prevented from sliding laterally thereon. The side wall 28 of the boss 22 coöperates with the adjacent walls 29 of the ribs 24 to define guideways which communicate with the interior of the receptacle 1.

In practical operation, the base 21 is upheld on a suitable support (not shown) by means of the rim 25. Flies or other insects pass into the interior of the trap, in a manner described in my prior patent above alluded to through the guideways defined by the side wall 28 of the boss 22 and the walls 29 of adjacent ribs 24.

Upon the flat top 23 of the boss 22 is placed a bait cup 30, the same preferably being secured to the top, as shown at 31—although it is within the skill of a mechanic to make the bait cup removable, should such a construction be considered desirable.

Having thus described the invention, what is claimed is:—

As an article of manufacture, a fly trap base fashioned from a single sheet of material struck upwardly to form a frusto-conical boss having a flat top and to form inverted trough-shaped ribs radiating from the boss, the lower end of the base terminating in a flat, outwardly extended, continuous, annular, supporting flange into which the side faces of the ribs merge at their outer ends; the upper edges of the ribs being flush throughout their lengths with the flat top of the boss, and being cut away, intermediate their ends, to form trap receiving notches.

In testimony that I claim the foregoing as my own, I have hereto affixed my signature in the presence of two witnesses.

JAMES GUY.

Witnesses:
W. S. FURAY,
JAMES ENNIS.

Copies of this patent may be obtained for five cents each, by addressing the "Commissioner of Patents, Washington, D. C."